April 15, 1969  F. F. ROGERS  3,439,266
METHOD OF AND SYSTEM FOR HETERODYNING EMPLOYING
A SINGLE SOURCE OF SIGNALS
Filed Oct. 1, 1965

INVENTOR
F. F. ROGERS
BY M. A. Addams
ATTORNEY

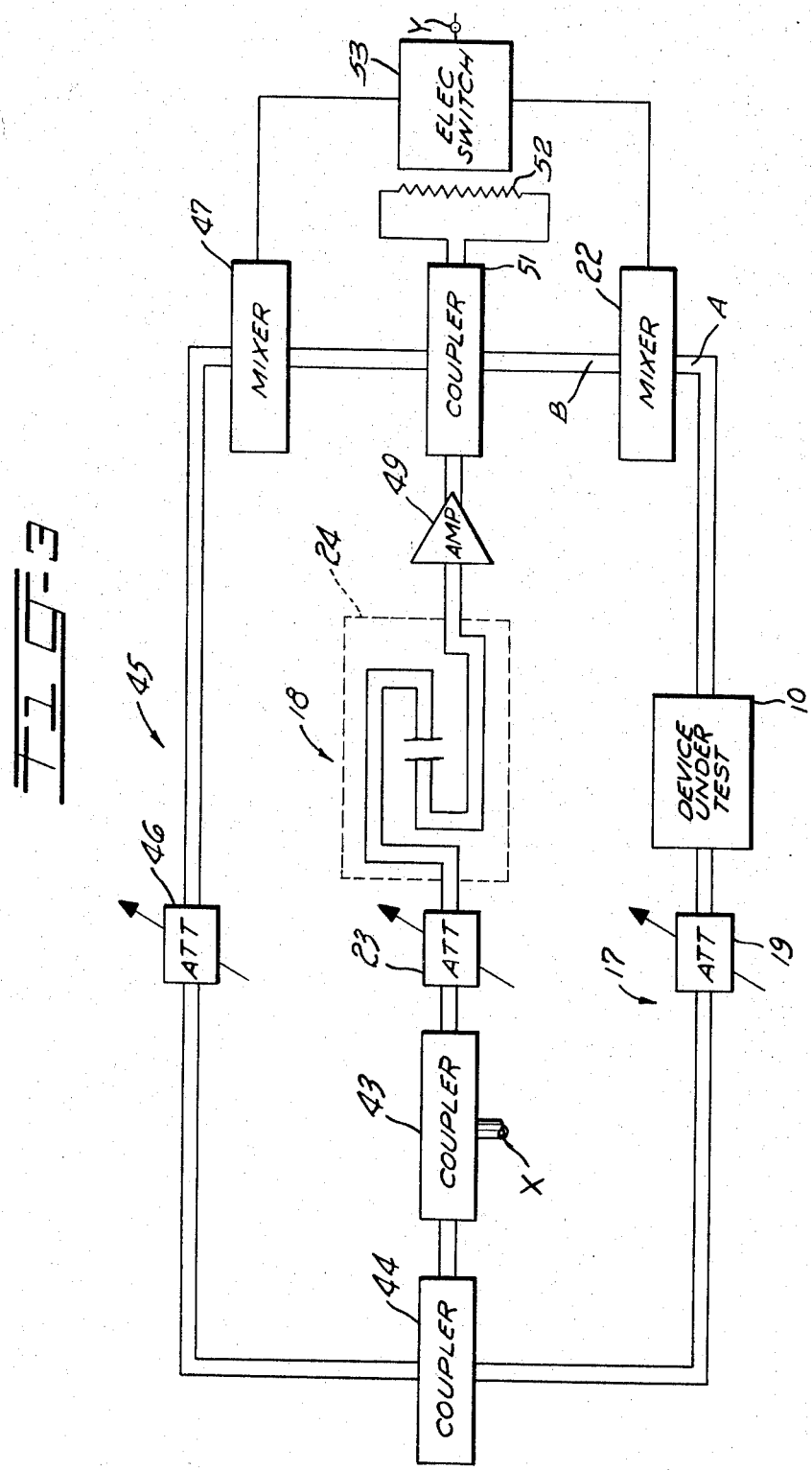

__United States Patent Office__  3,439,266
Patented Apr. 15, 1969

3,439,266
METHOD OF AND SYSTEM FOR HETERODYNING EMPLOYING A SINGLE SOURCE OF SIGNALS
Frederick F. Rogers, North Danville, N.H., assignor to Western Electric Company, Incorporated, New York, N.Y., a corporation of New York
Filed Oct. 1, 1965, Ser. No. 492,214
Int. Cl. G01r 27/04
U.S. Cl. 324—58                 1 Claim

ABSTRACT OF THE DISCLOSURE

The disclosure teaches a method and means for providing a heterodyne test system employing only a single sweep source of instantaneous frequencies. The source frequencies are varied sequentially and continuously from a start to a stop frequency. The source is fed simultaneously to a plurality of transmission line branches. One branch includes the electrical device under test, and a second branch includes a delay line element. At any given instant of time, the instantaneous frequencies of the output signals from the test and delay branches are different. These output signals are heterodyned to produce a resultant intermediate frequency signal having a wave form indicative of the transmission characteristics of the device under test. In a second embodiment the system includes a reference transmission line branch fed simultaneously as above by the source of signals. The output signal from the delay branch is also mixed with the reference branch output to produce an intermediate frequency reference signal against which the first-mentioned intermediate frequency signal may be compared.

---

This invention relates to a method of and system for heterodyning, and more particularly to a method of and system for heterodyning employing only a single source of signals.

In the testing of frequency sensitive electrical devices for insertion loss, return loss, or the like, heterodyne systems are usually employed where a high degree of sensitivity is required. Such systems are used where an output signal is desired which is in the intermediate frequency range.

Conventional heterodyne systems are usually of two types—swept frequency systems and single frequency systems. In either of these conventional systems, two sources of signals are required: the first is a source of testing signals, and the second is a source of heterodyne signals, commonly called a beating oscillator.

The swept frequency system is more practical than the single frequency system when testing electrical devices, for example bandpass filter, which operate over a band of frequencies. If a single frequency system were used to test such devices, the system would theoretically have to be adjusted a large number of times corresponding to different frequencies in the band of frequencies. Such point to point testing would be laborious and time consuming. With the swept frequency system, the full range of the operating band of frequencies, as well as frequencies beyond the operating band, can be applied to rapidly detect abnormalities in a characteristic of the device, such as insertion loss, return loss, or the like.

In the use of conventional swept frequency systems, complex control circuitry is required to accurately synchronize the source of testing signals with the source of heterodyne signals. Further, this complex control circuitry is subject to instability over long periods of time, and entails intricate operating procedures.

Accordingly, an object of the invention is to provide a new and improved method of and system for heterodyning.

Another object is to provide a new and improved method of and system for heterodyning employing only a single source of signals.

Another object is to provide a new and improved heterodyne system employing only a single source of signals, wherein the complex control circuitry associated with prior art heterodyne testing systems is eliminated.

Another object is to provide a heterodyne system wherein a band of signals is applied to a test branch and a delay branch, one of the branches including an element which renders it electrically long with respect to the other branch. The output signals of the test branch and the delay branch are heterodyned to produce an intermediate frequency signal. A related object is such a heterodyne system wherein the included element is a predetermined length of waveguide.

The heterodyne system of this invention has several advantages over conventional systems. One advantage is that the system of this invention employs only a single swept source of signals, thereby eliminating the separate source of heterodyne signals associated with conventional systems. Along with the elimination of the source of heterodyne signals is the elimination of (1) the complex control circuitry needed to synchronize the testing signals and the heterodyne signals, and (2) the intricate operating procedures necessitated by the complex control circuitry. The simplification of operating procedures, realized by the use of only a single source of signals in the system of this invention, permits the ready utilization of the system for production line testing of electrical devices.

With these and other objects in view, a heterodyne system, illustrating certain features of the invention, includes a source of testing signals for generating a band of signals between two predetermined frequencies. The band of signals is coupled to a circuit network which includes first and second transmission branches, one of the branches having connections for receiving a device under test. One of the branches includes an element which renders it electrically long with respect to the other branch. A mixing device is provided for heterodyning, referred to as beating, the output signals of the transmission branches to produce an intermediate frequency signal, which has an envelope indicative of a predetermined transmission characteristic of the device.

In a specific embodiment of the heterodyne system of the invention as applied to the testing of microwave devices, the system includes a swept signal source for generating a band of microwave signals which is continuously varied from a start frequency to a stop frequency. The band of signals is coupled to a circuit network comprising a test branch and a delay branch. The delay branch includes a predetermined length of waveguide which renders it physically and electrically long with respect to the test branch, and the test branch includes connections for receiving the device under test. A mixer is coupled to the output of the test and delay branches for heterodyning the test branch signal against the delay branch signal to produce an intermediate frequency signal. The frequency of the resultant signal is determined by the length of the waveguide in the delay branch, and its envelope is an indication of a predetermined transmission characteristic of the device under test.

In a method of heterodyning, illustrating certain principles of the invention, a swept band of signals, between two predetermined frequencies, is generated and applied to a pair of transmission branches; the band of signals being delayed in one of the branches. The output signals of the two branches are then heterodyned to produce an intermediate frequency signal.

Other objects and advantages of the invention will become apparent by reference to the following detailed specification and drawings, wherein:

FIG. 3 is an electrical block diagram of elements to be substituted between points X and Y of the system shown in FIG. 1, to form a second embodiment of the invention.

Figure 1:
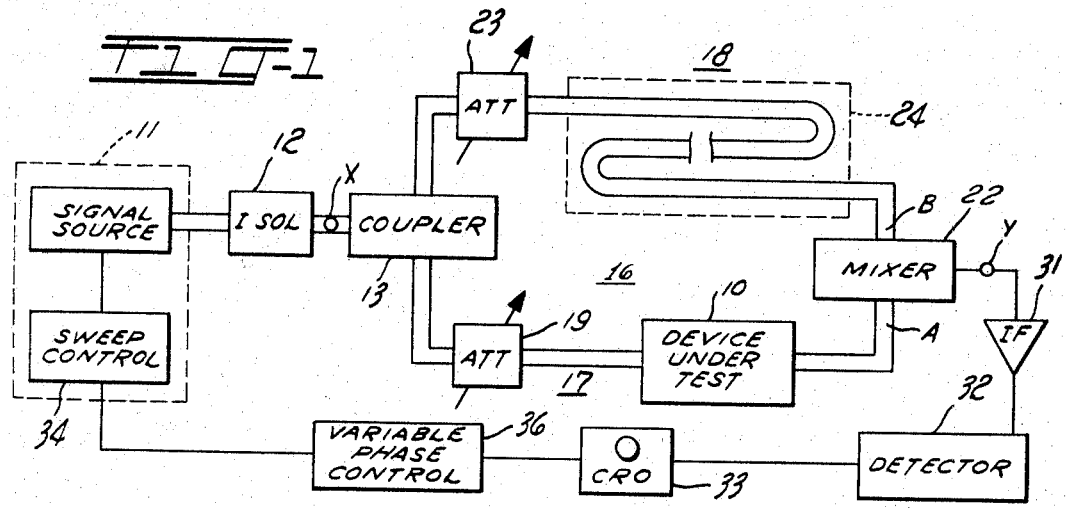
FIG. 1 is an electrical block diagram of a heterodyne system, illustrating certain principles of the invention.
Figure 2:
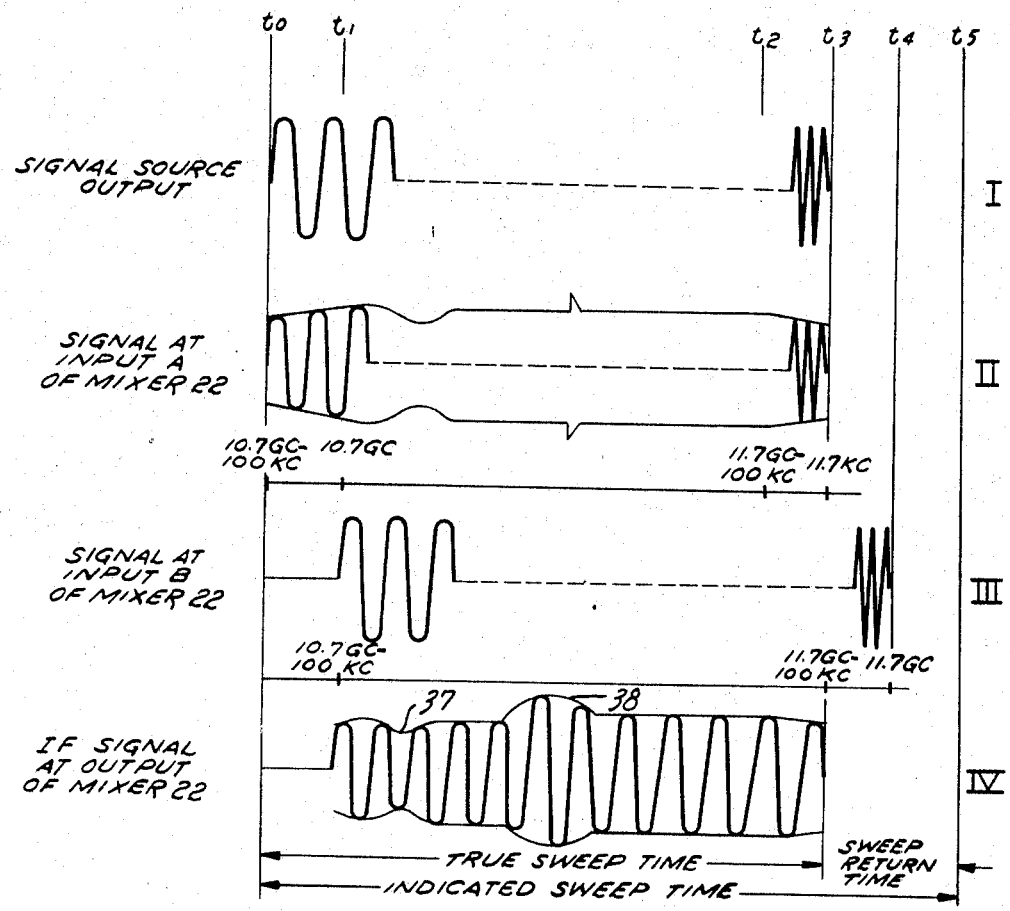
FIG. 2 is a waveform diagram of the electrical conditions existing at various points of the system shown in FIG. 1.

With reference to FIGS. 1 and 2, the heterodyne system of this invention will be described in the context of testing a microwave device 10, which by way of example may be a filter, isolator, attenuator, detector, or the like. However, as will be explained later, the system has general applicability to testing devices which are operative in all frequency ranges.

The system includes a swept signal source 11 which continuously generates a constant-amplitude band of signals varying between two predetermined frequencies in the microwave frequency range. For example, the band of signals may have a start frequency of 10.7 gc.−100 kc. which is swept to a stop frequency of 11.7 gc., or the band of signals may be swept from the higher to the lower frequency. Thus, the bandwith of the band of signals is 1.0 gc.+100 kc. (FIG. 2, line I).

The band of signals is applied to an isolator 12, which passes the band of signals without appreciable attenuation to a coupler 13 and prevents the reflection of any signals back to signal source 11. Coupler 13 feeds the band of signals to a transmission network 16 which comprises a test branch 17 connected in parallel with a delay branch 18.

Test branch 17 comprises a calibrated, variable attenuator 19 which is connected to coupler 13 and to microwave device 10 under test. Device 10 is also connected to an input A of a mixer 22.

Delay branch 18 comprises a calibrated, variable attenuator 23 connected to coupler 13 and to a delay element 24 comprising a predetermined length of waveguide. Delay element 24 is also connected to an input B of mixer 22. Attenuators 19 and 23 are provided for adjusting the power level of the signals in test branch 17 and delay branch 18, respectively.

The elements thus far described are interconnected by conventional waveguide sections. It is immaterial whether the waveguide sections have rectangular, circular or other cross-sectional configurations.

The band of signals generated by signal source 11 is a series of instantaneous frequencies, progressing from the start frequency to the stop frequency (FIG. 2, line I), which travel in test branch 17 and delay branch 18 at the same velocity. Delay element 24 is chosen to introduce a predetermined time delay into the signals traveling in delay branch 18. Thus, delay branch 18 is electrically and physically long with respect to test branch 17. It can be assumed that attenuators 19 and 23 and device 10 do not introduce any appreciable time delay into the signals in test branch 17 and delay branch 18.

The instantaneous frequencies of the band of frequencies in test branch 17 arrive at input A of mixer 22 (FIG. 2, line II) a predetermined time before the instantaneous frequencies of the band of frequencies in delay branch 18 arrive at input B of mixer 22 (FIG. 2, line III). Therefore, there is a frequency difference between the test branch and delay branch signals applied to inputs A and B of mixer 22, when both of these signals are present at the mixer.

When the delay branch and test branch signals are heterodyned against each other in mixer 22, the frequency of the mixer output signal at any instant of time is the difference between the instantaneous frequency of the test branch and the delay branch signals (FIG. 2, line IV). Such a difference frequency signal is commonly called an intermediate frequency (IF) signal. For the signals shown in lines II and III of FIG. 2, the resultant IF signal has a frequency of 100 kc. The IF signal has an envelope indicative of a characteristic of device 10. The characteristic may, by way of example, be insertion loss.

The IF signal from mixer 22 is applied through an amplifier 31 to a detector 32, whereat the alternating current IF signal is converted to a direct current signal. This D.C. signal is then applied to a cathode ray oscilloscope 33 which has the usual horizontal and vertical deflection plates. Signal source 11 includes a sweep control 34 which generates pulses which are coupled to oscilloscope 33 through a variable phase control 36 to synchronize the sweep of the oscilloscope with the sweep of the band of signals generated by signal source 11. Variable phase control 36 functions to hold the display of the IF signal on oscilloscope 33.

The frequency of the IF signal in cycles per second is a function of the predetermined length of waveguide used for delay element 24 and is ascertained in accordance with the following:

(1) $$IF = \frac{\lambda g}{C\lambda} \frac{(LBw)}{T}$$

(2) $$IF = \frac{1}{U} \frac{(LBw)}{T}$$

where $\lambda$ = wavelength of the instantaneous frequency of the band of signals, in air; in meters;

$\lambda g$ = wavelength of the instantaneous frequency of the band of signals in waveguide, in meters;

C = the velocity of light, in meters per second;

U = group propogation velocity, in meters per second;

L = physical difference in length between the test branch and delay branch, in meters;

T = true sweep time for a sweep of the band of signals from the start frequency to the stop frequency, in seconds; and Bw = the bandwidth of the band of signals, in cycles.

In an analysis of the above equation for a given application of the heterodyne system of the invention, C is a known physical constant; and $\lambda g$, $\lambda$, and T are ascertainable after a particular waveguide and bandwidth (Bw) of the band of signals are chosen. Thus, if it is desired that the frequency of the IF signal be 100 kc., then Equation 2 is solved for L. Therefore, the frequency of the IF signal can be selected by varying the length of the waveguide of delay element 24.

Referring to FIG. 2, line I represents the band of signals being generated by signal source 11. Line II represents the signals in test branch 17 which are applied to input A of mixer 22 at $t_0$. Line III represents the signals in delay branch 18 which are applied to input B of mixer 22 at $t_1$. The interval $t_1 - t_0$ represents the time delay introduced into the signals in delay branch 18 by delay element 24. The interval $t_4-t_3$ is equal to the time delay $t_1-t_0$. At $t_3$, the last instantaneous frequency of the band of signals in test branch 17 is completed (line II), and at $t_4$ the last instantaneous frequency of the band of signals in delay branch 18 is completed (line III). The true sweep time (T) for the band of signals to be swept from 10.7 gc.–100 kc. to 11.7 gc. consumes the time interval $t_3-t_0$. The time interval $t_5-t_3$ is the sweep return time of signal source 11. The IF signal is produced by mixer 22 only during the interval $t_3-t_1$ (line IV), since two input signals are required in order for the mixer to produce an output signal.

The signals depicted in lines I–III of FIG. 2 are only representative of the signals at the respective points of the system. The signals are greatly expanded to illustrate that there are fewer instantaneous frequencies, per unit time at the start frequency, and a larger number of instantaneous frequencies at the stop frequency of the band of signals.

Line IV illustratively represents the envelope of an IF signal, having a frequency of 100 kc., at the output of mixer 22. The magnitude of the envelope is representative of the insertion loss of a device 10. The insertion loss of device 10 is substantially uniform over the band of signals except for a lower loss at point 37 and a higher loss at point 38. The face of oscilloscope 33 may be calibrated to indicate the instantaneous frequency at which the irregular losses at point 37 and 38 occur, or a conventional frequency marker may be provided on the oscilloscope for this purpose.

By employing a predetermined length of waveguide as a delay element and a single swept frequency signal source, the heterodyne system of this invention produces an IF signal by heterodyne action. This is accomplished without the separate source of heterodyne signals, the complex synchronization circuitry, and the intricate operating procedures, associated with conventional heterodyne testing systems. Furthermore, it is not necessary that delay element 24 and test device 10 be in separate transmission branches; they may be placed in series in either branch 17 or 18 to produce an IF signal having an envelope indicative of a characteristic of device 10.

The principles of the invention can be employed to produce an IF signal in all frequency ranges. For example; at microwave and higher frequencies, delay element 24 may be a predetermined length of waveguide or stripline, or certain kinds of crystals; at high frequencies, delay element 24 may be a predetermined length of coaxial cable; and at lower frequencies, delay element 24 may be a device comprised of conventional capacitors and inductors.

In addition to use of the invention for testing of electrical devices, the invention broadly encompasses the concept of producing an intermediate frequency while employing only a single swept source of signals. Consequently, the invention has application in any system where intermediate frequencies are produced by heterodyne action, including communications systems. In such instances, of course, device 10 under test, would not be connected in either branch 17 or 18.

SECOND EMBODIMENT

Referring to FIG. 3, the combination of elements between points X and Y are substituted for the combination of elements between points X and Y of FIG. 1 to form a second embodiment of the invention.

Signal source 11 couples the band of signals to a coupler 43 which feeds the band of signals to delay branch 18 and to another coupler 44. Coupler 44 feeds the band of signals to a reference branch 45 and to test branch 17. Reference branch 45 comprises a calibrated, variable attenuator 46 connected to coupler 44 and to a mixer 47 which is connected to a coupler 51. An amplifier 49 is connected between delay element 24 and coupler 51 to amplify the output signal of delay branch 18 which has been attenuated by delay element 24. Amplifier 49 is not essential to the system, since the function of maintaining the signals in branches 17, 18, and 45 at equal power levels can be performed by attenuators 19, 23, and 46.

The output of test branch 17 is applied to input A of mixer 22, and the output of delay branch 18 is applied through coupler 51 to input B of mixer 22. A resistive element 52 is connected to coupler 51 for absorbing radio frequency energy, thereby preventing the reflection of signals back to other portions of the system.

The IF signals from mixers 22 and 47 are applied to an electronic switch 53 which couples the respective IF signals to be alternately displayed on oscilloscope 33. Electronic switch 53 operates sufficiently rapid that traces representing the respective IF signals appear to be simultaneously displayed on oscilloscope 33. Thus, in addition to the IF signal from mixer 22, which is the result of mixing the signal in test branch 17 and the signal in delay branch 18, the IF signal from mixer 47, which is the result of mixing the signal in reference branch 45 and the signal in delay branch 18, is displayed on oscilloscope 33.

In operation of the embodiment of the invention shown in FIG. 3, a piece of waveguide is connected into test branch 17 instead of device 10 under test. Thus, test branch 17 and reference branch 45 are substantially structurally identical. Attenuators 19 and 46 are varied until the displays on oscilloscope 33, representing the IF signals from mixers 22 and 47, are at the same power level. Controls on oscilloscope 33 are then manipulated until the two displays coincide, thus indicating that the system is calibrated.

A device 10 is then inserted into test branch 17 in place of the above-mentioned piece of waveguide. Attenuator 19 in test branch 17 is then varied until the display on oscilloscope 33 from mixer 22 intersects the trace from mixer 47. The amount of insertion loss in test branch 17 caused by device 10 can be ascertained from the calibration on attenuator 19. Furthermore, oscilloscope 33 is observed to ascertain any abnormalities in insertion loss of device 10, such as that indicated at points 37 and 38 of line IV, FIG. 2.

What is claimed is:

1. A heterodyne method of displaying, on an oscilloscope, the variation in amplitude of a predetermined transmission characteristic of an RF test component over a wide percentage frequency band, which comprises the steps of:

generating an RF signal of variable frequency;

frequency-modulating the RF signal over the wide frequency band;

applying the frequency modulated signal to a first transmission branch that includes the component under test;

simultaneously applying the frequency modulated signal to a second transmission branch whose effective length is sufficiently different from the length of the first branch that each instantaneous frequency in the band appearing at the output of the first branch differs by at least thousands of cycles from the frequency in the band appearing at the same moment at the output of the second branch;

heterodyning the output signals from the first and second branches to generate an intermediate frequency signal substantially equal to the number of cycles in the difference between the instantaneous frequencies at the outputs of the first and second branches, the variation of amplitude of the intermediate frequency signal over the wide frequency band corresponding to the transmission characteristics of the component over the wide band;

applying the modulating signal to the horizontal input of the oscilloscope; and applying the intermediate frequency signal to the vertical input of the oscilloscope to display the transmission characteristic of the component under test over the wide band.

References Cited

UNITED STATES PATENTS

| | | | |
|---|---|---|---|
| 2,971,153 | 2/1961 | Wharton et al. | 324—58.5 |
| 3,034,046 | 5/1962 | Sasaki | 324—58.5 |
| 3,265,967 | 8/1966 | Heald | 324—58.5 |
| 2,813,250 | 11/1957 | Tyson | 324—84 |

FOREIGN PATENTS

| | | |
|---|---|---|
| 1,139,204 | 11/1962 | Germany. |
| 1,312,022 | 11/1962 | France. |

OTHER REFERENCES

Dropkin: "Direct Reading Microwave Phase," IRE National Convention Record, part 1, vol. 6 (1958), pp. 57–63.

RUDOLPH V. ROLINEC, *Primary Examiner.*

P. F. WILLE, *Assistant Examiner.*